US006874099B1

(12) United States Patent
Balasubramanian et al.

(10) Patent No.: US 6,874,099 B1
(45) Date of Patent: Mar. 29, 2005

(54) METHOD AND SOFTWARE FOR TESTING AND PERFORMANCE MONITORING

(75) Inventors: Balagurunathan Balasubramanian, Irving, TX (US); Nadirshah Jivani, Carrollton, TX (US); Lih-jong Ma, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 520 days.

(21) Appl. No.: 09/871,304

(22) Filed: May 31, 2001

(51) Int. Cl.[7] ................................................ G06F 11/00
(52) U.S. Cl. ............................. 714/4; 714/47; 709/223; 709/224
(58) Field of Search ....................... 714/4, 47; 709/223, 709/224

(56) References Cited

U.S. PATENT DOCUMENTS

| | | | | |
|---|---|---|---|---|
| 5,920,722 A | * | 7/1999 | Damron ....................... 717/159 |
| 6,141,125 A | * | 10/2000 | Blair et al. .................... 398/32 |
| 6,249,886 B1 | * | 6/2001 | Kalkunte ...................... 714/47 |
| 6,343,320 B1 | * | 1/2002 | Fairchild et al. ............. 709/224 |
| 6,363,421 B2 | * | 3/2002 | Barker et al. ................ 709/223 |
| 6,374,371 B1 | * | 4/2002 | Lee .............................. 714/42 |
| 6,397,244 B1 | * | 5/2002 | Morimoto et al. ........... 709/200 |
| 6,449,739 B1 | * | 9/2002 | Landan ......................... 714/47 |
| 6,522,631 B2 | * | 2/2003 | Rosborough et al. ........ 370/252 |
| 6,631,409 B1 | * | 10/2003 | Watson et al. ................ 714/47 |
| 6,654,914 B1 | * | 11/2003 | Kaffine et al. ................ 714/43 |
| 6,665,822 B1 | * | 12/2003 | Conway ....................... 714/47 |

* cited by examiner

Primary Examiner—Robert Beausoliel
Assistant Examiner—Emerson Puente

(57) ABSTRACT

One embodiment of the present invention provides a method for testing and monitoring software applications such as naming services, messaging services, publish/subscribe services, authentication/authorization services, transaction services, and the like. The method involves testing multiple elements of the application so as to ease trouble-shooting in the event of failure of some element of the application. A preferred embodiment also gathers performance statistics which can prove useful in analyzing loads and efficiencies of various applications and processes or elements within an application.

31 Claims, 9 Drawing Sheets

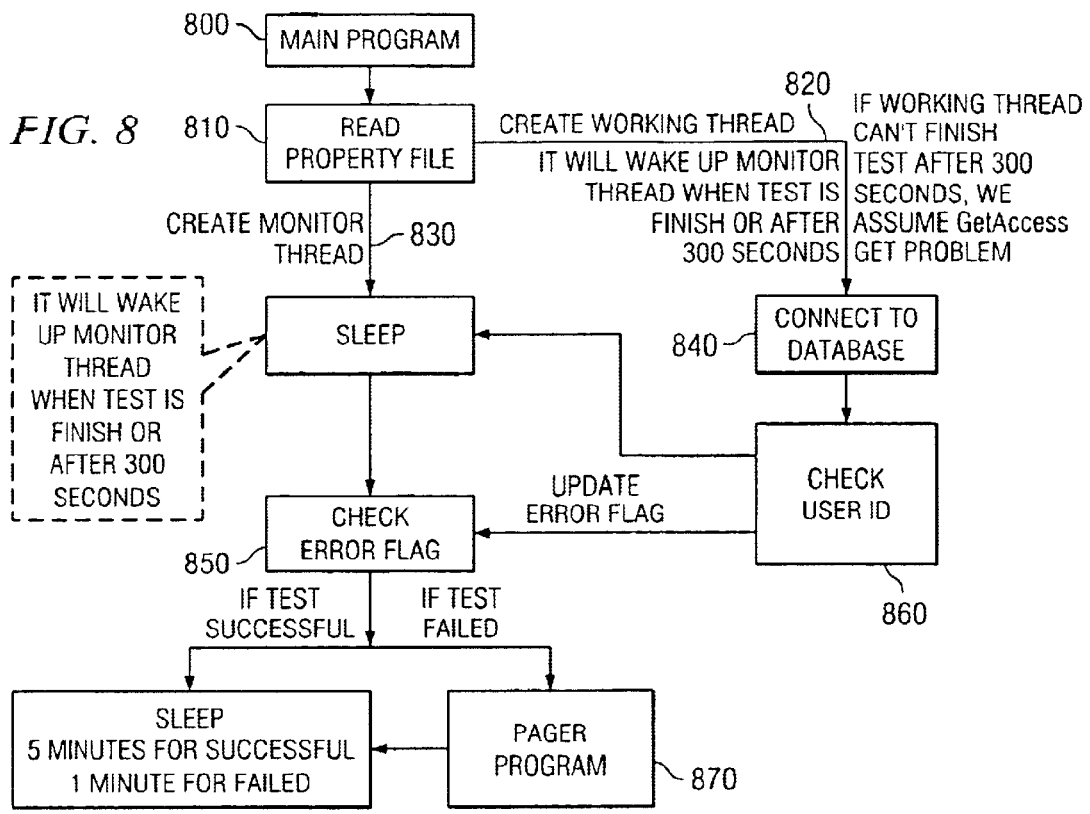
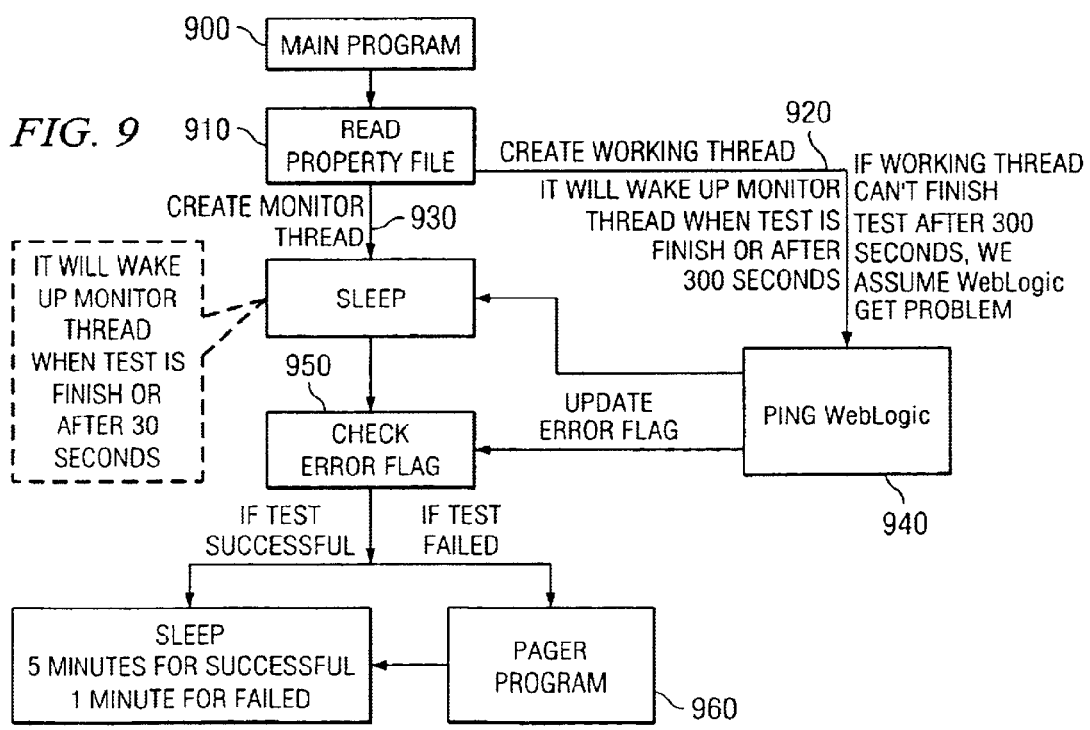

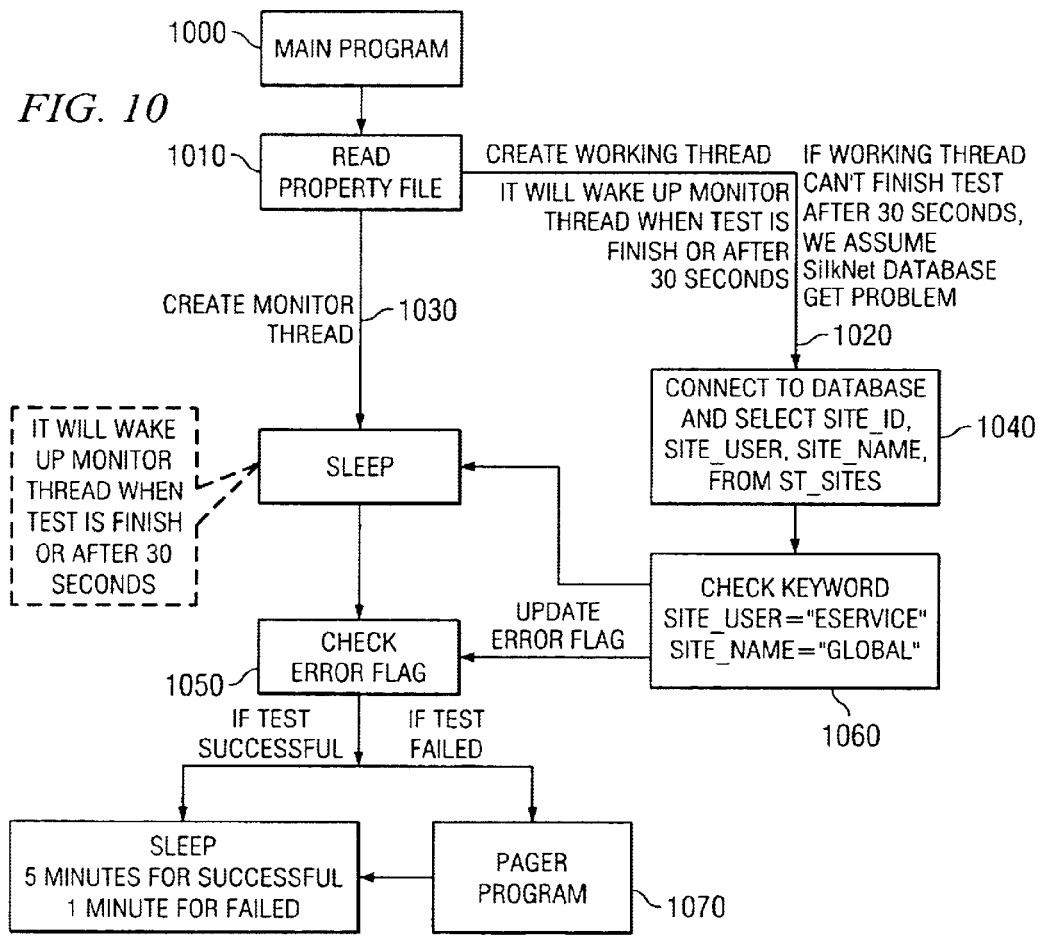

METHOD AND SOFTWARE FOR TESTING AND PERFORMANCE MONITORING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The field of the present invention includes methods for monitoring the performance of diverse computing systems and applications. More particularly, embodiments of the present invention provide methods for testing and simultaneously assessing the performance of multiple functional elements of both internally developed and off-the-shelf, third-party middleware products operating under multiple platforms.

BACKGROUND OF THE INVENTION

Computer networks transmit data between the individual components in the network along multiple communication channels. One type of a distributed object system which participates in computer networks is a distributed object system that is defined under the Common Object Request Broker Architecture (CORBA) specification produced by OMG. Distributed object systems may be in the context of an Object Request Broker (ORB) implemented under the CORBA specification from the OMG, Revision 2,0, Revision 2.1, Revision 2.2 and Revision 2.3, all of which are incorporated herein by reference in their entirety. For purposes of this application, programs and communications compliant with CORBA Revision 2.3, 2.2, and 2.1, by definition will be viewed as compliant with CORBA Revision 2.0 and will be referred to simply as CORBA-compliant Unless otherwise specified, a generic reference to the CORBA Services specification will be presumed to be OMG's CORBA Services Revision 2.0. Another method for communicating between computers in a network is Hypertext Transfer Protocol or HTTP. HTTP-compliant communications provide the current backbone communications standard for web-based (or URL based) access on the internet Underlying both HTTP and in some circumstances CORBA is the TCP/IP protocol. This protocol is used in networks to exchange and verify information. In the preferred networks, communications in HTTP-compliant protocol and communications in CORBA-compliant protocol will each also be compliant with and run over a as foundation TCP/IP protocol. The standards for HTTP protocol and TCP/IP protocol are growing and changing but are readily available and familiar to those of skill in the art.

Numerous tests, both manual and automated, can be conducted to ensure that individual middleware applications or components (such as naming services, messaging services, publish/subscribe services, authentication and authorization services and the like) are operating properly. With different applications, different elements provide key functionality. For example in some applications, multiple channels of communication are used for different functions within the application. For others, multiple objects (including daemons) interact with differing requests. For still others, multiple "servers" may be involved to provide differing elements of the service provided by the application. In general, each type of application and/or element within the application requires a different type of test to be performed. For example, a computer operator can "ping" an internet address to determine if it responds and to check the response time. An operator could also send a test signal from one device within the network to another to determine if an immediate error message is received or to measure the time for message delivery. A different type of test is typically needed for each type of system being tested, such as publish/subscribe systems, authentication systems, or naming services.

Such manual testing procedures are time consuming and labor intensive. Therefore, numerous automated, software-based products have been created that allow the unattended monitoring of network components. These products, however, typically provide only a limited amount of error checking and monitor only a narrow range of components. For example, an automated monitoring system might record that an error has occurred if an immediate error message is received but might be incapable of determining whether the time required for a transmission has exceeded a predetermined maximum acceptable duration. Also, such automated monitoring programs are typically capable of testing only one type of network component. For example, if a computer system contains both web-based components and client/server components, one suite of software is needed to monitor the web-based devices and another to monitor the client/server devices. Each suite presents its own interface to the user. No integrated interfaces are known to exist that would allow a user to simultaneously access both suites of monitoring programs. If a new component is added to the network, a new monitoring program and new user interface would be needed.

In addition to the above limitations, existing monitoring products are difficult to modify when changes are made to the devices or applications being monitored. Also, when an existing product detects an error, a message is typically sent to the user's interface screen; no error logging or error notification services are provided. The applicant is aware of no product that simultaneously tests multiple aspects of the performance of multiple elements (i.e., communication channels, objects, servers), provides error logging and error notification capabilities, is easily expandable, and presents an integrated interface for applications across multiple platforms.

SUMMARY OF THE INVENTION

The preferred embodiment of the invention includes methods for testing and monitoring applications. These methods would include sending a first test signal to elicit a response from a first element of an application, monitoring the application for the response to the first test signal, and checking the response to the first test signal. The preferred method would additionally include sending a second test signal to elicit a response from a second element of the application, wherein the second element is independent and distinct from the first element. With respect to the second test signal the preferred method would similarly monitor the application for the response to the second test signal, and check the response to the second test signal. Finally the preferred method would include reporting the results of checking the responses to the first and second test signals. In more preferred embodiments, reporting the results could include sending notification based on the presence of predefined results and recording the results in a datastore. In various embodiments the applications tested and monitored could include, but are not limited to, a messaging service, a publish/subscribe service, a naming service, a transaction service, and an authentication/authorization service. Likewise in various embodiments the elements responding to the test signals could include channels, objects (including daemons), and servers.

In another form, an embodiment may provide a computer program product for implementing a method for testing and monitoring applications. The computer program product could include computer code that sends a first test signal to elicit a response from a first element of the monitored application. The embodiment could further include computer code that monitors the application for the response to the first test signal and that checks the response to the first test signal. The embodiment would preferably additionally include computer code that sends a second test signal to elicit a response from a second element of the application, wherein the second element is independent and distinct from the first element. Similarly the embodiment would also include computer code that monitors the application for the response to the second test signal and that checks the response to the second test signal. With the responses in hand the embodiment would provide computer code that reports the results of checking the responses to the first and second test signals. Finally this embodiment would preferably include a computer readable medium that stores the computer codes.

DESCRIPTION OF THE DRAWINGS

The invention, together with further advantages thereof, may best be understood by reference to the following description taken in conjunction with the accompanying drawings in which:

FIG. 8 is a flow chart of an authentication/authorization service monitoring program.

FIG. 9 is a flow chart of an application server monitoring program.

FIG. 10 is a flow chart of a relational database monitoring program.

DETAILED DESCRIPTION

Figure 1:
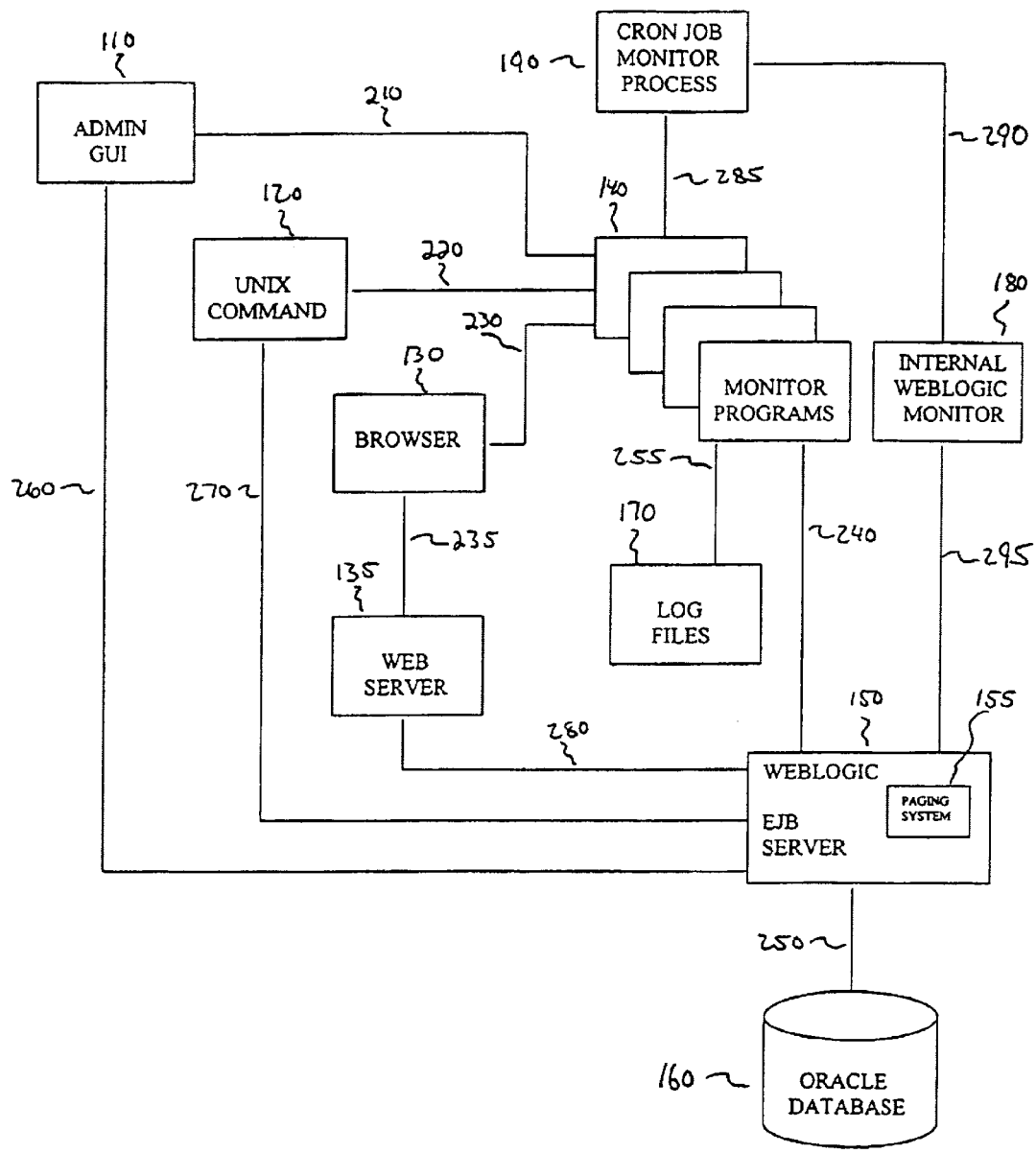
FIG. 1 is a structural diagram of the preferred embodiment of the major components within the invention including the use of a database for data storage.

The Enterprise Integrated Testing and Performance Monitoring Software (hereafter referred to as the Integrated Monitoring System) provides an automated, integrated environment for simultaneously monitoring multiple aspects of the performance of computing systems operating under multiple platforms. A networked computer system may contain numerous heterogeneous components such as web servers, name servers, messaging systems, databases, authorization services, transaction brokers, and other products. Each of these components may have internal elements providing different functions (for example, internal communication channels as well as communication channels to the other components). Modular monitoring programs exist within the Integrated Monitoring System that test the performance of each of these elements. The monitoring programs work in independent threads to test functional elements of the monitored devices. Thus, if a failure occurs anywhere within the network, the Integrated Monitoring System is able to assist in pinpointing the exact location of the breakdown since it will provide needed trouble-shooting information of which elements are functioning and which are not.

The Integrated Monitoring System presents the user with an integrated interface for all components being monitored. All control functions and displays of test data are accessed through the same set of screens regardless of whether a web-based system, a client/server system, a combination of both, or some other type of configuration is being tested. This integration of functionality makes the internal operation of the system transparent to the end user. A user familiar with the system's operating procedures will not need additional training if the administrators of the system add or modify any monitoring programs.

The Integrated Monitoring System performs both failure testing and performance monitoring. After the test signal is transmitted, the process of watching for (or monitoring for) a response, where the response could include an error message, a correct response to the signal, or an incorrect response to a signal, may be referred to as monitoring the application for a response. The process of investigating to see if a response has been received, and if it was received reviewing and evaluating the response and/or the time between test and response may be referred to as checking the response. In this context, evaluating may include checking to see if the response is an error message or may also include a separate evaluation of a nonerror response to see if it matches a predefined criterion. Thus, in the preferred embodiment, in addition to testing whether an error message is received when a test signal is transmitted (failure testing), the invention allows the user to specify a maximum acceptable length of time for a transmission to occur. If a signal is transmitted but does not reach its destination within the specified time, an error condition is defined to exist (performance monitoring). In addition, the Integrated Monitoring System provides error notification and error; logging capabilities. If an error occurs, the appropriate party is automatically notified by pager, e-mail, or some other electronic messaging or notification system. All of the test data generated by the Integrated Monitoring System is logged in either a plain text file or a database for future analysis. Finally, the Integrated Monitoring System is easily modifiable and expandable. Due to the modular nature of the monitoring programs, new programs can easily be added and existing programs can easily be updated when a new device is added to the network and/or when changes are made to a monitored device.

Overview of General Operation

The general operating principles of the invention can best be understood by reference to FIG. 1. Multiple monitoring programs 140 independently test the performance of devices and processes such as messaging servers, name servers, transaction brokers, authorization services, publish/ subscribe systems, databases, web servers, and internally developed middleware products. The capabilities of the monitoring programs are not confined to these types of systems or to any particular vendor's implementation of these systems The programs are modular in nature and can be modified, upgraded, or replaced with ease. New modules can easily be added to monitor devices for which monitoring programs do not currently exist. Modularity also allows flexibility in where the monitor programs reside. All of the monitor programs can be placed on a single server or, if the need arises, the programs can be distributed among several servers.

In the preferred embodiment of the invention, input of data into the monitoring programs 140 is achieved through three interfaces, an Administrative Graphical User Interface 110, a UNIX Command Tool 120, and a web browser window 130. The primary means of interaction with the monitoring programs 140 is through the Administrative Graphical User Interface 110 (Admin GUI), an interactive XWindows display. The Admin GUI 110, by means of communication channel 210, allows a user to start or stop the monitoring of all processes of all types, all processes of a particular type, or a particular process of a particular type. The Admin GUI 110 also displays whether the monitored processes are running or not. In addition, the adding of new devices to the monitoring system, the updating of device properties, and the updating of the error notification system data can all be done through the Admin GUI 110. While the XWindows Admin GUI 110 is the preferred embodiment, alternative embodiments such as a Windows NT GUI or any other graphical user interface familiar to those of skill in the art could be used as well.

When a user accesses the Integrated Monitoring System via Telnet, the XWindows graphical interface, and therefore the Admin GUI 110, is not available. In this case, the UNIX Command Tool 120, by means of communication channel 220, can be used to perform many of the functions of the Admin GUI 110. The UNIX Command Tool 120 is a text-based method for starting or stopping individual monitoring programs and for displaying the status of the devices being monitored. While the UNIX Command Tool 120 is the preferred embodiment, alternative embodiments such as DOS-based commands or any other text-based or command line input system (or command line input tool) familiar to those of skill in the art could be used as well.

The third method of interaction with the Integrated Monitoring System is through the web browser window 130. The browser 130 allows a user to access the monitoring system, remotely through a secure World Wide Web page. In the preferred embodiment, the user can update the error notification system data by means of the browser 130 and communication channel 230. The browser 130 displays whether or not a process is running as well as how long the process has been running, a function not available in the Admin GUI 110 or the Command Tool 120. Alternatively, although less desirable for security reasons, the web browser may be enabled with all of the functionality of either or both the Admin GUI or the Command Tool.

The monitor programs 140, described in detail below, operate in independent threads to test the elements within and between the components of heterogeneous computing systems. The monitors 140 send test signals to the elements and record the times required between transmission of the test signal and receipt of the response transmission from the monitored application or component (the response time). If a response time between two devices exceeds a user-defined maximum or if an error message is received indicating that a response could not be achieved, a failure condition is defined to exist. For each test signal transmitted by a monitor program 140, the program 140 sends either the response time or a failure notification to a data repository. In the preferred embodiment, the test results are sent to both a database 160 and a log file 170. Data to be stored in the log files 170 is sent directly to the log files 170 via communication channel 255. Data to be stored in the database 160 is first sent to the WebLogic Enterprise Java Bean (EJB) Server 150 via communication channel 240. While the WebLogic EJB Server 150 is the preferred embodiment, alternative embodiments such as other EJB Servers or any other server similar in function to an EJB Server could be used as well.

In the preferred embodiment, an error notification system 155 is internal to the server 150. In the preferred embodiment, the notification system 155 is a paging system that automatically sends a page to the appropriate party for the device that failed. Alternative embodiments for the notification system 155 could be an automated e-mail system, a telephone system, similar notification methods, or a combination of the above. Additionally, an escalation of notification methods could be employed in which, for example, an e-mail is sent and if no response is received then a page is sent and if a response is still not received then a direct phone call is placed. In another embodiment of the notification system, the number of failures could be counted and the notification system could be activated only when some pre-specified number of failures has occurred. In the preferred embodiment, the information used by the notification system, such as the pager numbers to be called, the times and days a particular pager is to be called, and how often a pager is to be called, is stored in the database 160. In alternative embodiments, the notification system data could be stored in plain text files either within the monitor programs themselves or in independent files. Typically in these cases, due to the lower level of flexibility afforded by text files, the only types of data stored would be the pager numbers to be called and whether to call the regular-hours pager or the after-hours pager.

In the preferred embodiment, an internal monitor program 180 tests the availability of the server 150 and the database 160 by attempting to connect to the server 150 through communication channel 295. The internal monitor 180 then attempts to retrieve data from the database 160 through communication channel 250. If a successful connection is made, the monitor programs 140 send their test results to the server 150 via communication channel 240 and from there to the database 160 through communication channel 250. In the most preferred embodiment, if the connection fails, the internal monitor 180 will automatically switch to an alternate EJB server. If the internal monitor 180 is not able to achieve a connection to the server 150 and database 160, the monitor programs 140 send their test results only to the log files 170. Thus, in the preferred embodiment, test data is always stored in the log files 170 and test data is also stored in the database 160 if the database 160 is available. Although not described in detail in the below specific descriptions, it is preferred that this process for storing results is implemented by each described monitor program. Note also that it is preferred to store the results at the end of each monitor cycle along with a specific report of any error flags (a component of the results). Alternatively, results could be stored by the monitor program individually upon receipt before the later evaluation of error flags set during the process, but this is not the preferred alternative as it is considered less efficient. For this application, the process of storing results, either in log files, in the database, or otherwise, and the process of notification through the paging systems described above, each are defined to be subsets under the generic description reporting of results.

The server 150 transmits test data via communication channel 250 to a relational database 160 which, in the preferred embodiment, is an Oracle database. Other types of databases or directories could be used as well. For example, an LDAP compliant directory could be employed. For purposes of this application, the term database refers to any such data storage and retrieval system. Data in the database 160 can be retrieved for display on the Admin GUI 110, the Command Tool 120, or the browser 130. The interfaces 110, 120, and 130 communicate with the database 160 through the server 150. Requests for data from the database 160 via the server 150 and the displaying of data on the Admin GUI 110 and the Command Tool 120 are handled by communication channels 260 and 270, respectively. When the browser 130 requests data from the database 160, the request passes through communication channel 235 to a web server 135 then through communication channel 280 to the server 150. Data to be displayed by the browser 130 passes in a reverse fashion from the server 150 through communication channel 280 to the web server 135 and through communication channel 235. In addition to being displayed in real-time on the interfaces 110, 120, and 130, the data in the database 160 could also be retrieved for analysis (or mined) at a later time for parameters such as average transmission times, peak load times, and data flow efficiency. This data mining potential represents another facet of the performance monitoring capabilities of the preferred embodiment and can result in the adjustment of resource allocation to the monitored applications based on the analysis of loads and times for the monitored applications.

Figure 2:
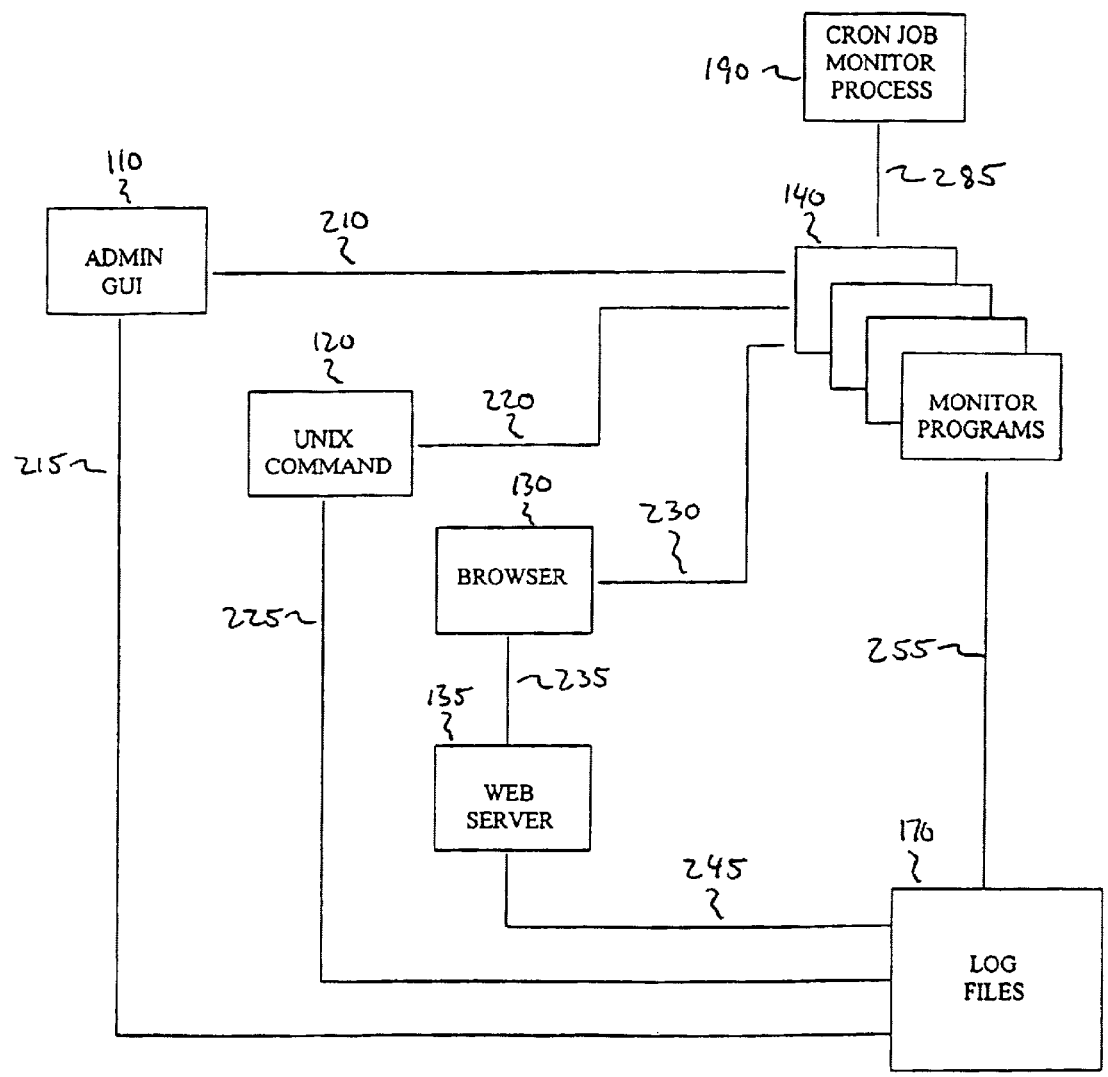
FIG. 2 is a structural diagram of an alternative embodiment of the major components within the invention including the use of log files for data storage.

In the alternative embodiment depicted in FIG. 2, test data is passed directly between the monitor programs 140 and the log files 170 via communication channel 255 and no database is used. In this embodiment all other components of the Integrated Monitoring System such as the interfaces 110, 120, and 130 and the monitor programs 140 remain essentially the same as in the preferred embodiment. In a preferred mode for this alternative embodiment, the paging system resides in the monitor programs themselves. In an alternative mode, the paging system could reside on a separate server. The use of a database requires a greater level of complexity in the initial software set-up but allows greater flexibility and ease of use in the mining and analysis of the test data. The use of log files provides simplicity in the initial software coding but requires greater effort for later data analysis.

In both the preferred embodiment depicted in FIG. 1 and the alternative embodiment a depicted in FIG. 2, a process 190 exists which performs a limited amount of monitoring on the monitor programs themselves. The preferred embodiment of this process 190 is a UNIX cron job that runs every ten minutes to ensure that each of the individual monitor programs 140 is in operation. The cron job 190 automatically restarts any monitor program 140 it finds not running. In alternative embodiments, monitoring periods other than ten minutes could be used and scheduling programs other than a UNIX cron job could be used.

Features of the Integrated Monitoring System

Existing monitoring systems typically can monitor multiple devices or components only if the devices are of the same general type. For example, existing products might test a suite of components operating in a web-based (URL-based) environment or a suite of components operating in a client/server environment Applicant is not aware of a product that simultaneously tests both web and client/server systems. The independent monitoring programs and integrated interface of the present invention provide this capability. Each individual monitor can test the elements within a specialized type of device The monitors also have the ability to specifically test channels between one device and another. The results from the intra-device and inter-device tests are communicated to the integrated interface giving the end user the appearance of a single testing mechanism for all elements within a heterogeneous computer network.

The capability to test multiple functional elements allows the Integrated Monitoring System to pinpoint where a breakdown in communication has occurred. A data signal in a network often must pass through multiple devices and multiple functions on the way to its destination. A failure could occur at any point in the path. Existing products typically test only for the arrival of the signal at its destination. If the response arrives as expected the test is considered a success. The failure of the response to arrive at its destination indicates that a communication or functional breakdown exists but it is typically not possible to determine at what point in the path the failure occurred. The Integrated Monitoring System tests multiple elements along the path of the test signal and its response. If a test signal transmitted by the Integrated Monitoring System fails to provide the desired response at its final destination the system provides more information to narrow towards the precise link in the path where the breakdown occurred.

Products currently on the market typically provide monitoring only for failure conditions. That is, a test signal is transmitted and the monitor merely determines whether an error message is returned. The present invention extends this functionality by adding a performance testing feature. The length of time needed to complete a test and response is measured and compared against a user-defined standard. If the specified maximum allowable response time is exceeded, an error condition is defined to exist. The type of performance testing done by the Integrated Monitoring System generally depends on whether the device being monitored is internally developed or an off-the-shelf product. For internally developed products, the test signals transmitted along the communication channels generate or simulate functional responses used by live devices. The performance test results are therefore an accurate measure of actual data processing and transmission times. For off-the-shelf products, a ping (or equivalent existent or response query) is used instead of a live data transmission. Since the transmission time for a ping response does not necessarily reflect the transmission and functional processing time for live data, the monitor programs merely record whether the ping was successful and log the response times of the pings. With no real evaluation of the functional performance of the tested elements, an alternative embodiment would not even record the response time for these tests but could simply indicate whether there was an affirmative response. When a connection failure or a performance test failure occurs, the Integrated Monitoring System automatically notifies the appropriate party by means of the automated error notification system described earlier.

The Integrated Monitoring System is easily modifiable and upgradeable. Due to the modular nature of its design, individual monitoring programs can be added, modified, or replaced as needed. This modularity also allows monitoring programs to be created for both in-house and off-the-shelf, third-party devices. No existing products are known to have this capability.

Monitor Programs

The individual monitoring programs are independently innovative whether used in isolation or as modules within the Integrated Monitoring System. In the preferred embodiment, monitoring programs are present for Sprint in-house systems known as Mercury, Persistent Naming Service (PNS), and Message Broker. In the preferred embodiment, monitoring programs are present for the following third-party systems: NES, GetAccess, WebLogic, SilkNet, and TPBroker. The capabilities of the Integrated Monitoring System should not be considered to be limited to these specific systems, however. The technology used to monitor these systems could be used to monitor any similar messaging services, publish/subscribe systems, authentication systems, database access systems, or naming services.

The following discussions of the individual monitoring components within the Integrated Monitoring System contain references to a paging system. The traditional wireless messaging system as commonly understood by the term "paging system" is the preferred embodiment of the notification system used by the Integrated Monitoring System but should not be considered the only possible embodiment. Alternatives include e-mail, telephone, and other types of electronic communication. Similarly, instead of a pager number, equivalent alternatives such as e-mail address or telephone number would be substituted. It should also be understood that the paging system is not necessarily activated on every occurrence of an error condition. When a page has been sent, a delay period occurs before another page is sent even if the error condition persists. The length of the delay period can be set by the end user.

All of the individual monitoring programs use a set of parameters known collectively as property values. The fields contained within these parameters vary slightly from monitor to monitor but the property values can be considered to have a common functionality and they share several fundamental characteristics. The main property values used in the preferred embodiment include the server name, the error message to be transmitted, and performance monitoring criteria such as the maximum length of time a test procedure should run and the length of time the various threads should sleep. In the following discussions of the individual monitors, specific threshold times for test procedure lengths and sleep periods are given. The threshold times are not required to have the values given and can be modified by the user through the Admin GUI or an equivalent interface. Other property values include the pager number to be called in case of an error condition and Boolean values indicating whether the regular-hours pager or the after-hours pager should be activated. In the preferred embodiment, the property values reside within a database. In alternative embodiments, the property values could be stored in the monitor programs themselves or in plain text files.

Figure 3:
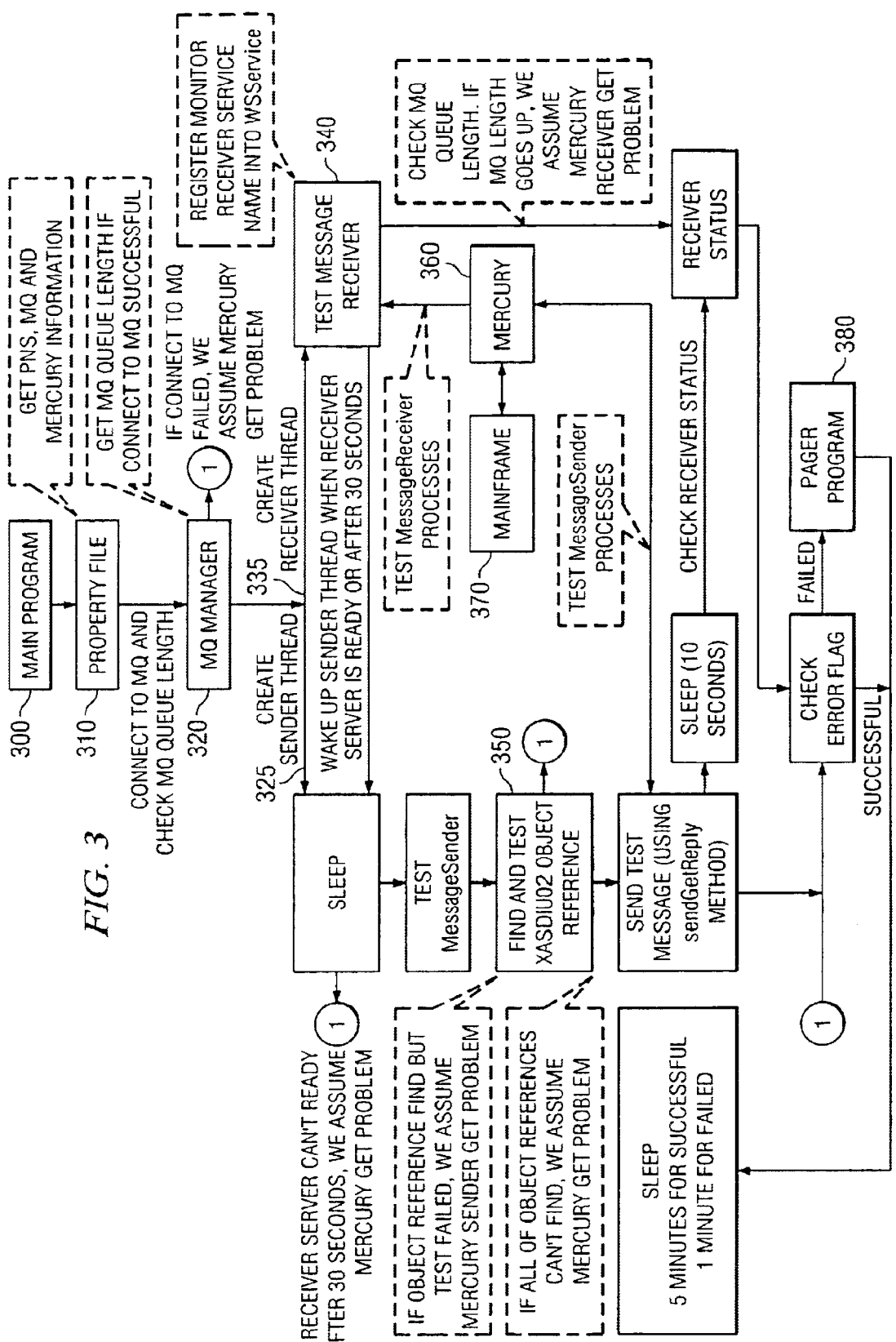
FIG. 3 is a flow chart of a messaging monitoring program.

Mercury is an internally developed, CORBA-compliant messaging system. It bridges the asynchronous IBM MQSeries applications with synchronous, CORBA-compliant applications. Like other similar messaging services, it uses a send channel and a receive channel. The elements of the messaging service tested by this monitor program are the send channel and the receive channel. Test signal communications are preferably TCP/IP-compliant and more preferably CORBA-compliant. The performance monitoring approaches described below would likewise apply to any messaging service using send and receive channels regardless of the specific products or platforms involved. FIG. 3 depicts a preferred flow chart for the Mercury monitor program. The first step in the Mercury monitor program is the reading of the property files 310 by the main program 300 to get information about the Persistent Naming Service (PNS), IBM MQSeries (MQ), and Mercury devices. The main program 300 then tries to connect to the MQ Manager 320. If the connection to the MQ Manager 320 fails, a failure notice is sent to the error notification system 380. If the connection to the MQ Manager 320 is successful, the main program 300 will preferably obtain the queue depth and then create two threads; the sender thread 325 and the receiver thread 335. The sender thread 325 immediately goes into a sleep mode. The receiver thread 335 attempts to register a message object with PNS. When the message object has been registered, the receiver server 340 is considered ready. The receiver thread 335 wakes the sender thread 325 when the receiver server 340 is ready or after 30 seconds. If the receiver server 340 is not ready within 30 seconds, a failure notice is sent to the error notification system 380. When the sender thread 325 wakes, it attempts to find a designated object reference or a set of object references 350. If all of the object references 350 are not found or if the object references 350 are found but the test fails, a failure notice is sent to the error notification system 380. If the object references 350 are successfully found and tested, the sender thread 325 sends a test message to Mercury 360. If an error occurs in the sending process, a failure notice is sent to the error notification system 380. After the test message is sent, the sender thread 325 sleeps for 10 seconds. Mercury 360 sends the test message to the mainframe 370. If the mainframe 370 receives the message it sends a test message back to Mercury 360. Mercury 360 then sends the test message to the receiver server 340. The receiver server 340 checks the MQ queue depth. If the MQ queue depth increases, a failure notice is sent to the error notification system 380. If an error occurs in the receiving process, a failure notice is sent to the error notification system 380. With this and the remaining monitor programs in the preferred embodiments, results are reported (specifically stored) at this point, prior to sleeping at cycle conclusion. If all test messages are received successfully, the sender thread 325 sleeps for five minutes. If a failure occurs at any point in the monitoring process, the sender thread 325 sleeps for one minute. At the end of the one-minute or five-minute sleep period the monitoring procedure just described is repeated.

Figure 4:
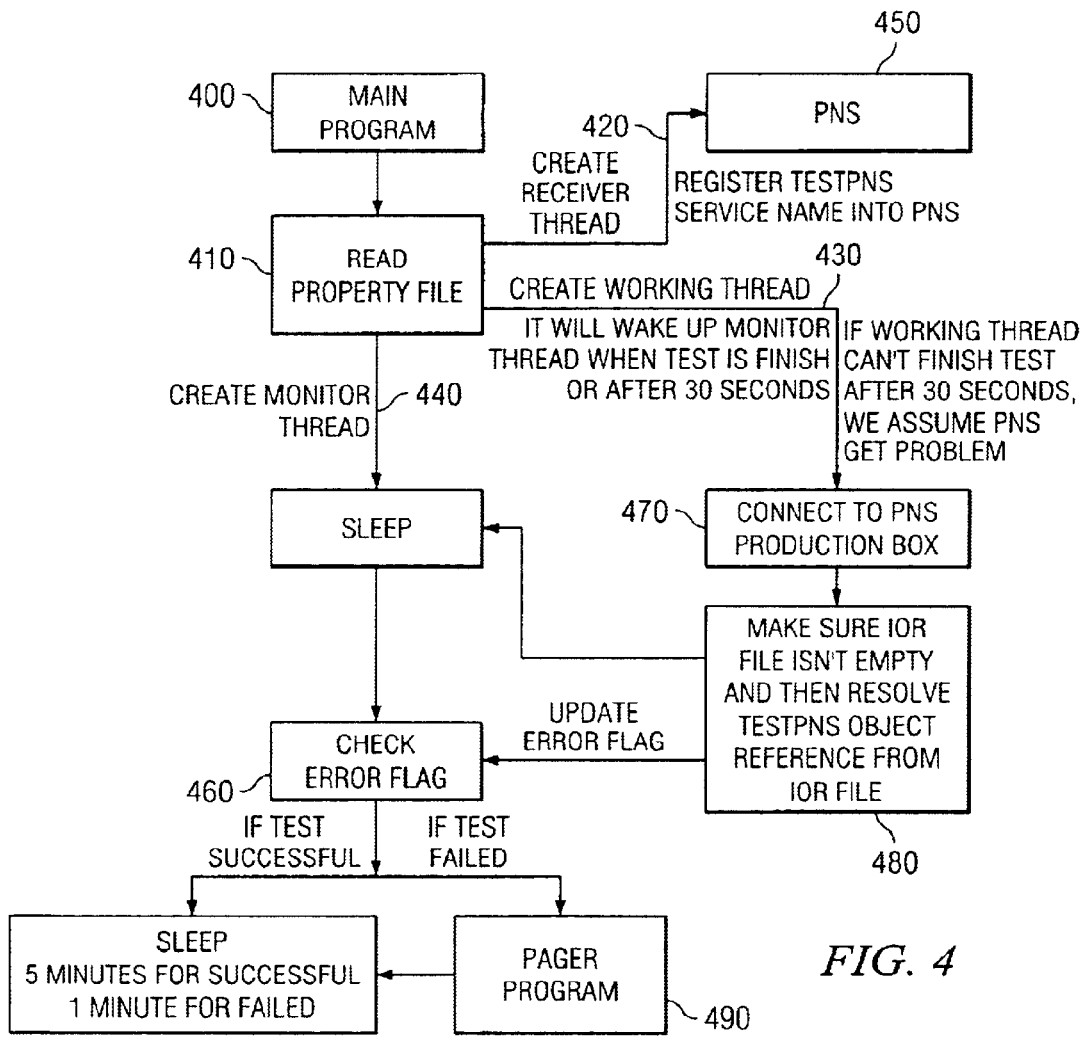
FIG. 4 is a flow chart of a naming service monitoring program.

The Persistent Naming Service (PNS) is an internally developed, CORBA-compliant name server. Like other name servers, PNS registers and resolves humanly recognizable names to object references. The elements of the naming service tested by this monitor program are the register object and the resolve object Test signal communications are preferably TCP/IP-compliant and more preferably CORBA-compliant (where TCP/IP underlies the CORBA IIOP (Internet Inter-ORB Protocol) standard). The performance monitoring approaches described below would likewise apply to any non-persistent CORBA-compliant name server or more generally to any name server regardless of CORBA compliance. FIG. 4 depicts a preferred flow chart for the PNS monitor program. The first step in the PNS monitor program is the reading of the property files 410 by the main program 400. Three threads are then created; the receiver thread 420, the working thread 430, and the monitor thread 440. The monitor thread 440 immediately goes into a sleep mode. The receiver thread 420 registers the TESTPNS service name into PNS 450. If the registration is unsuccessful, the error flag 460 is updated. The working thread 430 attempts to connect to the PNS production box 470. If the connection cannot be completed, the error flag 460 is updated. If the connection is completed, the working thread 430 makes sure the inter-object reference (IOR) file 480 is not empty and then resolves the TESTPNS object reference from the IOR file 480. If the IOR file 480 is empty or the TESTPNS object reference cannot be resolved, the error flag 460 is updated. When all of the above tests are completed, the working thread 430 wakes the monitor thread 440. If the above tests are not completed within 30 seconds, the error flag 460 is updated and the working thread 430 wakes the monitor thread 440. When the monitor thread 440 is awakened, it checks the error flag 460. If the error flag 460 indicates a test failure, the paging system 490 is notified and the monitor thread 440 goes into sleep mode for one minute. If the testing was successful, the monitor thread 440 goes into sleep mode for five minutes. At the end of the one-minute or five-minute sleep period the monitoring procedure just described is repeated.

Figure 5:
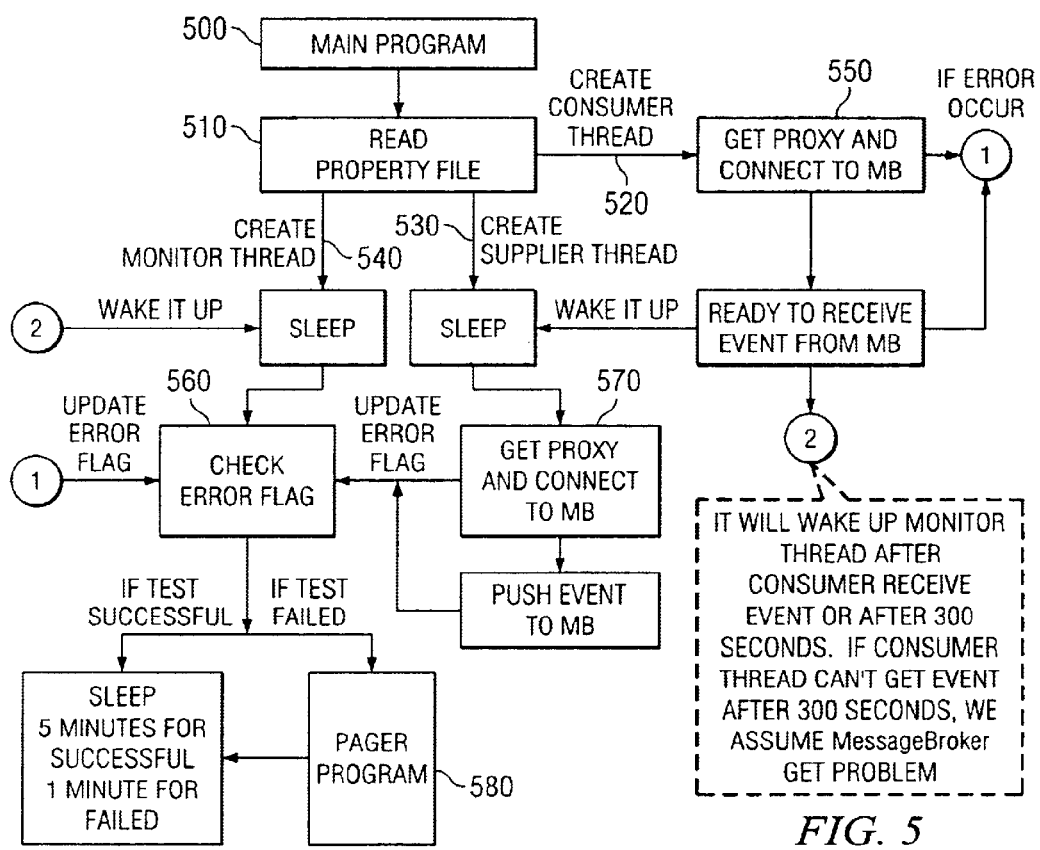
FIG. 5 is a flow chart of a publish/subscribe service monitoring program.

Message Broker is an internally developed, asynchronous, CORBA-compliant message system operating in a publish/subscribe or consumer/supplier environment The elements of the publish/subscribe service tested by this monitor program are the publish channel and the subscribe channel. Test signal communications are preferably TCP/IP-compliant and more preferably CORBA-compliant The performance monitoring approaches described below would likewise apply to any CORBA-compliant publish/subscribe service or any publish/subscribe service regardless of CORBA compliance. FIG. 5 depicts a preferred flow chart for the Message Broker monitor program. The first step in the Message Broker monitor program is the reading of the property files 510 by the main program 500. Three threads are then created; the consumer thread 520, the supplier thread 530, and the monitor thread 540. The supplier thread 530 and monitor thread 540 immediately go into a sleep mode. The consumer thread 520 attempts to contact a proxy and make a connection 550 to the Message Broker. If an error occurs in contacting the proxy or in making a connection 550 to the Message Broker, the consumer thread 520 updates the error flag 560. If the connection 550 to the Message Broker is successful, the consumer thread 520 wakes the supplier thread 530 and is ready to receive an event from the Message Broker. If the consumer thread 520 does not receive an event after 300 seconds, it updates the error flag 560 and wakes the monitor thread 540. If the consumer thread 520 does receive an event, it wakes the monitor thread 540. When the supplier thread 530 wakes, it attempts to contact another proxy and make another connection 570 to the Message Broker. If the connection 570 to the Message Broker is successful, the supplier thread 530 attempts to push an event to the Message Broker. If the connection 570 to the Message Broker is unsuccessful, the supplier thread 530 updates the error flag 560. When all of the above tests are completed, the monitor thread 540 is awakened. If the above tests are not completed within 300 seconds, the error flag 560 is updated and the monitor thread 540 is awakened. When the monitor thread 540 is awakened, it checks the error flag 560. If the error flag 560 indicates a test failure, the paging system 580 is notified and the monitor thread 540 goes into sleep mode for one minute. If the testing was successful, the monitor thread 540 goes into sleep mode for five minutes. At the end of the one-minute or five-minute sleep period the monitoring procedure just described is repeated.

Figure 6:
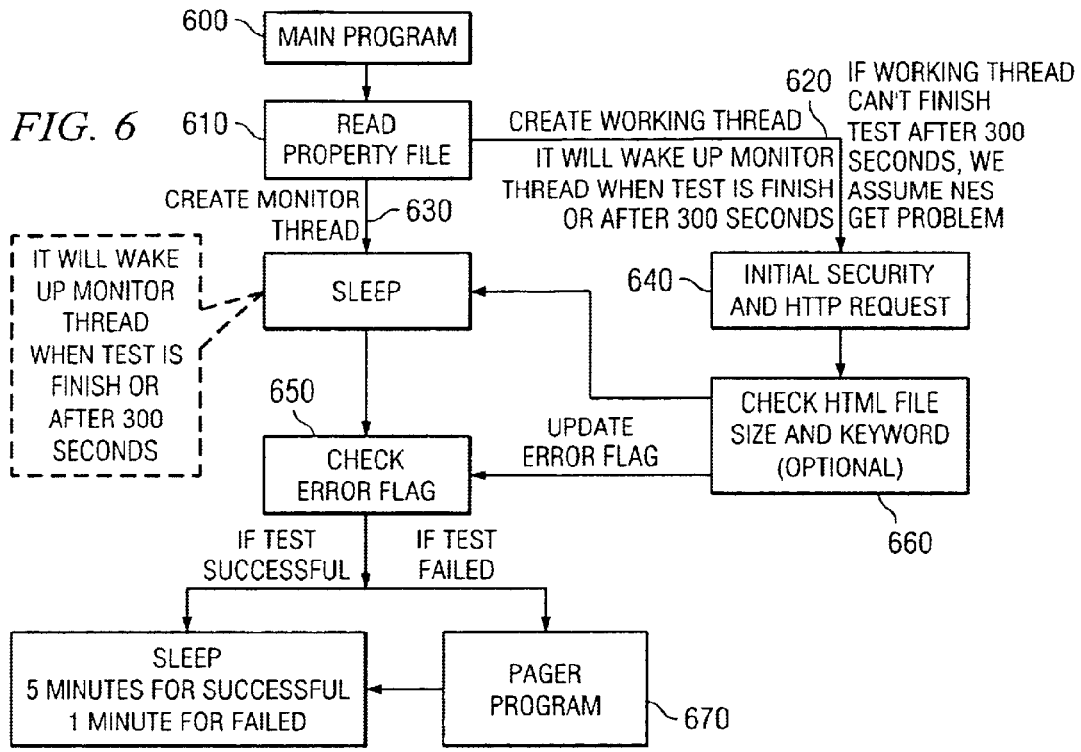
FIG. 6 is a flow chart of a web server monitoring program.

The Netscape Enterprise Server (NES) is a third-party web server that can operate in a secure or non-secure mode. Like other web servers, NES resolves an http request to an IP address and a port number and then finds the file server where the requested file is stored. Test signal communications are preferably TCP/IP-compliant and more preferably HTTP-compliant. The performance monitoring approaches described below would likewise apply to any web server. FIG. 6 depicts a preferred flow chart for the NES monitor program. The first step in the NES monitor program is the reading of the property files 610 by the main program 600. Two threads are then created; the working thread 620 and the monitor thread 630. The monitor thread 630 immediately goes into a sleep mode. The working thread 620 attempts to call up a web page. If the page is secure, a security request 640 is initiated. If access to the page is denied, the error flag 650 is updated. If access to the page is granted or if no security request was needed, the working thread 620 requests the web page. If the page cannot be accessed, the error flag 650 is updated. If the page is accessed, the working thread 620 checks the file size. If the file size is zero, the error flag 650 is updated. If the file size is non-zero, the optional keyword 660 may be checked if the user specifies, in one of the property parameters that this test is to be performed. If the keyword 660 is incorrect, the error flag 650 is updated. When all of the above tests are completed, the working thread 620 wakes the monitor thread 630. If the above tests are not completed within 300 seconds, the error flag 650 is updated and the working thread 620 wakes the monitor thread 630. When the monitor thread 630 is awakened, it checks the error flag 650. If the error flag 650 indicates a test failure, the paging system 670 is notified and the monitor thread 630 goes into sleep mode for one minute. If the testing was successful, the monitor thread 630 goes into sleep mode for five minutes. At the end of the one-minute or five-minute sleep period the monitoring procedure just described is repeated.

GetAccess is a third-party authentication and authorization service that protects web-based resources. When a user enters a valid login ID and password, GetAccess retrieves the user's data from a database and displays a personalized HTML page. The performance monitoring approaches described below would likewise apply to any similar authentication and authorization service. The Integrated Monitoring System tests two aspects of the GetAccess system. The GetAccess Access Server monitor depicted in FIG. 7 tests the elements used to authenticate and authorize a user. The GetAccess Register Server monitor program depicted in FIG. 8 independently tests the communication channels directly into the GetAccess database. The elements of the authorization/authentication service tested by this monitor program thus include both the access server and the register server. Test signal communications are preferably TCP/IP-compliant and more preferably HTTP-compliant. It is possible for a communication failure to occur in the authentication/authorization aspects of the GetAccess system while the channels to the database are still functional. By testing the authentication/authorization elements and the database access elements independently, the Integrated Monitoring System can better pinpoint where a breakdown in the GetAccess system is occurring.

Figure 7:
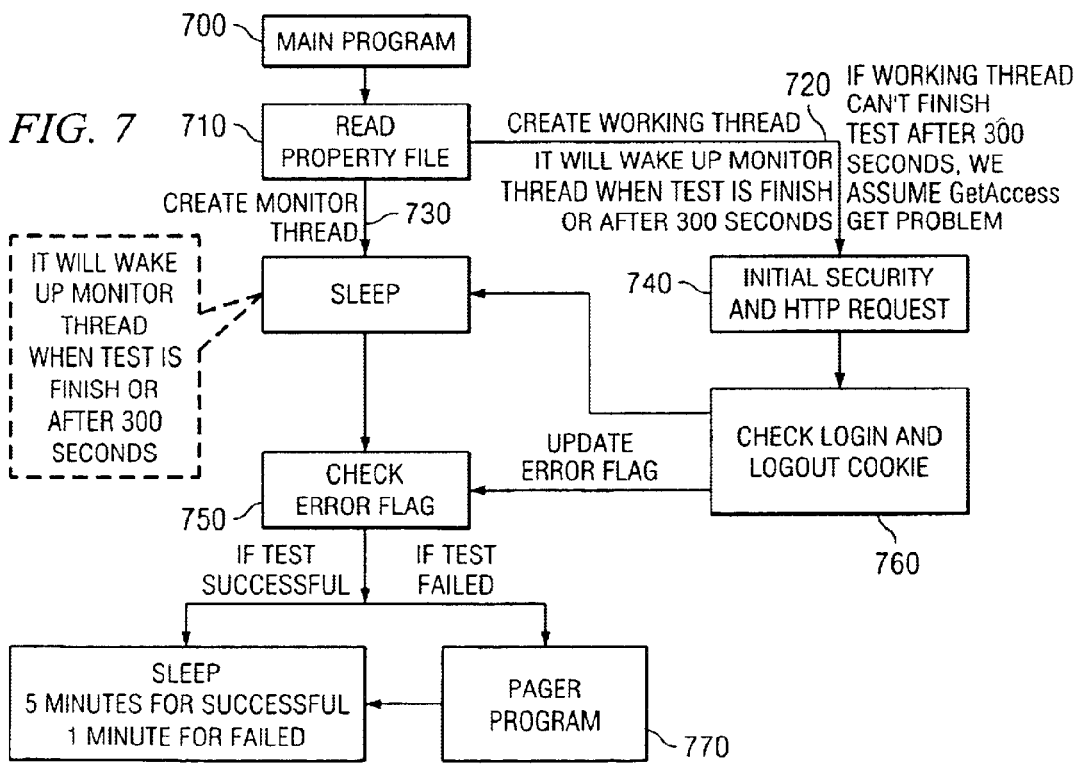
FIG. 7 is a flow chart of an authentication/authorization service monitoring program.

As shown in FIG. 7, the first step in the GetAccess Access Server monitor program is the reading of the property files 710 by the main program 700. Two treads are then created; the working thread 720 and the monitor thread 730. The monitor thread 730 immediately goes into a sleep mode. The working thread 720 attempts to call up a web page (to best test the system, a secure page) using a stored login ID and password. A security request 740 is initiated. If access to the page is denied, the error flag 750 is updated. If access to the page is granted or if no security request was needed, the working thread 720 checks the login/logout cookie 760. If the login/logout cookie 760 is not valid, the error flag 750 is updated. If the cookie 760 is valid, the working thread 720 wakes the monitor thread 730. If the above tests are not completed within 300 seconds, the error flag 750 is updated and the working thread 720 wakes the monitor thread 730. When the monitor thread 730 is awakened, it checks the error flag 750. If the error flag 750 indicates a test failure, the paging system 770 is notified and the monitor thread 730 goes into sleep mode for one minute. If the testing was successful, the monitor thread 730 goes into sleep mode for five minutes. At the end of the one-minute or five-minute sleep period the monitoring procedure just described is repeated.

GetAccess Register Server is the component of the GetAccess authentication/authorization system that manages access to the GetAccess database. FIG. 8 depicts a preferred flow chart of the GetAccess Register Server monitor program. The first step in the GetAccess Register Server monitor program is the reading of the property files 810 by the main program 800. Two threads are then created; the working thread 820 and the monitor thread 830. The monitor thread 830 immediately goes into a sleep mode. The working thread 820 attempts to connect to the database 840. If a connection to the database 840 cannot be completed, the error flag 850 is updated. If a connection to the database 840 is made, the working thread 820 checks the user ID 860. If the user ID 860 is incorrect, the error flag 850 is updated. When all of the above tests are completed, the working thread 820 wakes the monitor thread 830. If the above tests are not completed within 300 seconds, the error flag 850 is updated and the working thread 820 wakes the monitor thread 830. When the monitor thread 830 is awakened, it checks the error flag 850. If the error flag 850 indicates a test failure, the paging system 870 is notified and the monitor thread 830 goes into sleep mode for one minute. If the testing was successful, the monitor thread 830 goes into sleep mode for five minutes. At the end of the one-minute or five-minute sleep period the monitoring procedure just described is repeated.

WebLogic is a third-party application server that, like other application servers, acts as a middle tier between web-based front-end clients and existing back-end applications such as databases and legacy mainframe systems. Test signal communications are preferably TCP/IP-compliant and more preferably HTTP-compliant but could alternatively be CORBA-compliant. Two independent monitor programs exist within the Integrated Monitoring System to test the performance of WebLogic. The primary monitor tests WebLogic in the course of its normal use. WebLogic Server 150 (in FIG. 1) is itself a WebLogic EJB Server used internally in the Integrated Monitoring System itself to connect the monitor programs to the database 160 (in FIG. 1). A second monitor tests the performance of this version of WebLogic Server 150. With the minor variations described below, the same procedures are used in both monitor programs. The performance monitoring approaches described below would likewise apply to any application server. FIG. 9 depicts a preferred flow chart of the WebLogic monitor program. The first step in the WebLogic monitor program is the reading of the property files 910 by the main program 900. Two threads are then created; the working thread 920 and the monitor thread 930. The monitor thread 930 immediately goes into a sleep mode. In the primary WebLogic Monitor, the working thread 920 attempts to send a TCP/IP transaction to WebLogic Application Server 940. In the internal WebLogic Monitor, an attempt is made to connect to the WebLogic server (150 in FIG. 1) and retrieve data from the database (160 in FIG. 1). Both of these transactions are denoted in FIG. 9 as a "ping". If the transmission of the TCP/IP transaction or retrieval of data from the database is successful, the working thread 920 wakes the monitor thread 930. If the TCP/IP transmission or the retrieval of data is not successful within 300 seconds, the error flag 950 is updated and the working thread 920 wakes the monitor thread 930. When the monitor thread. 930 is awakened, it checks the error flag. 950. If the error flag 950 indicates a test failure, the paging system 960 is notified and the monitor thread 930 goes into sleep mode for one minute. If the testing was successful, the monitor thread 930 goes into sleep mode for five minutes. At the end of the one-minute or five-minute sleep period the monitoring procedure just described is repeated.

SilkNet DB is a third-party database access server that acts as a middle tier between clients and an Oracle database. The performance monitoring approaches described below would likewise apply to any database access server interacting with any relational database. The test signal communications are preferably TCP/IP-compliant and more preferably CORBA-compliant. In the preferred embodiment, SQL is the language used for communication between SilkNet and the database. In alternative embodiments, minor modifications could be made to the monitor program that would allow it to be used with other query languages. FIG. 10 depicts a preferred flow chart of the SilkNet DB monitor program. The first step in the SilkNet monitor program is the reading of the property files, 1010 by the main program 1000. Two threads are then created; the working thread 1020 and the monitor thread 1030. The monitor thread 1030 immediately goes into a sleep mode. The working thread 1020 attempts to connect to the database 1040. If a connection to the database 1040 cannot be completed, the error flag 1050 is updated. If a connection to the database 1040 is made, the working thread 1020 checks the keyword 1060. If the keyword 1060 is incorrect, the error flag 1050 is updated. When all of the above tests are completed, the working thread 1020 wakes the monitor thread 1030. If the above tests are not completed within 30 seconds, the error flag 1050 is updated and the working thread 1020 wakes the monitor thread 1030. When the monitor thread 1030 is awakened, it checks the error flag 1050. If the error flag 1050 indicates a test failure, the paging system 1070 is notified and the monitor thread 1030 goes into sleep mode for one minute. If the testing was successful, the monitor thread 1030 goes into sleep mode for five minutes. At the end of the one-minute or five-minute sleep period the monitoring procedure just described is repeated.

Figure 11:
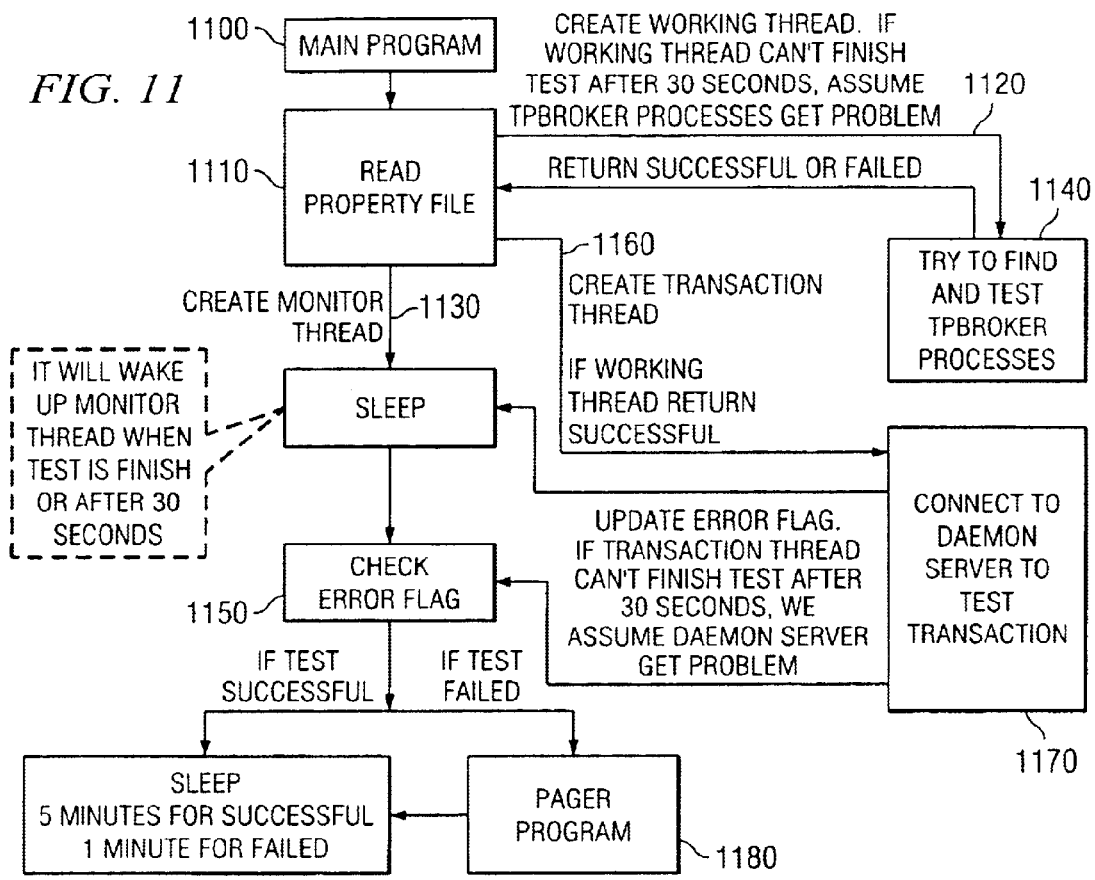
FIG. 11 is a flow chart of a transaction broker monitoring program.

TPBroker is a CORBA-compliant, third-party transaction broker that, like other transaction brokers, ensures that transactions are completed successfully. The elements of the transaction service tested by this monitor program preferably include the OTS daemon, the completion daemon, the recovery daemon, and the transaction daemon (which for the purposes of this application may also be referred to more generally as objects). The test signal communications are preferably TCP/IP-compliant and more preferably CORBA-compliant. The performance monitoring approaches described below would likewise apply to any CORBA-compliant transaction broker. FIG. 11 depicts a preferred flow chart of the TPBroker monitor program. The first step in the TPBroker monitor program is the reading of the property files 1110 by the main program 1100. Two threads are then created; the working thread 1120 and the monitor thread 1130. The monitor thread 1130 immediately goes into a sleep mode. The working thread 1120 attempts to find and test the TPBroker process 1140. If the test of the TPBroker process 1140 fails, the error flag 1150 is updated. If the test of the TPBroker process 1140 is successful, the working thread 1120 creates the transaction thread 1160. The transaction thread 1160 tries to connect to the daemon server 1170 to test a transaction. Specifically, the OTS daemon, the completion daemon, the recovery daemon, and the transaction daemon are tested. If the test of the transaction is unsuccessful, the error flag 1150 is updated. When all of the above tests are completed, the transaction thread 1160 wakes the monitor thread 1130. If the above tests are not completed within 30 seconds, the error flag 1150 is updated and the transaction thread 1160 wakes the monitor thread 1130. When the monitor thread 1130 is awakened, it checks the error flag 1150. If the error flag 1150 indicates a test failure, the paging system 1180 is notified and the monitor thread 1130 goes into sleep mode for one minute. If the testing was successful, the monitor thread 1130 goes into sleep mode for five minutes. At the end of the one-minute or five-minute sleep period the monitoring procedure just described is repeated.

The Integrated Monitoring System contains a process to perform a limited amount of failure monitoring on the monitor programs themselves. In the preferred embodiment, a UNIX cron job runs periodically to ensure that all of the individual monitoring programs are in operation. The cron job automatically restarts any monitor it finds not running. In an alternative embodiment, any scheduling program familiar to those of skill in the art could be used to check the operation of the monitoring programs.

Computer Systems

Figure 12:
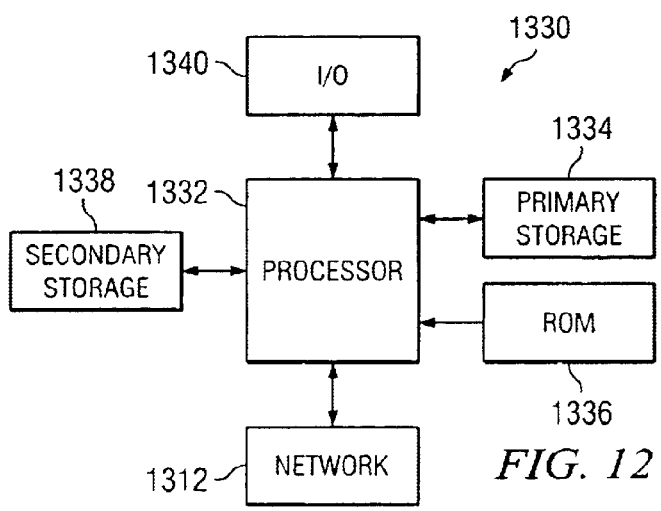

An integrated monitoring system as described above may generally be implemented on a variety of different computer systems. FIG. 12 illustrates a typical, general-purpose computer system suitable for implementing the present invention. The computer system 1330 includes a processor 1332 (also referred to as a central processing units, or CPU) that is coupled to memory devices including primary storage devices 1336 (typically a read only memory, or ROM) and primary storage devices 1334 (typically a random access memory, or RAM).

As is well known in the art, ROM acts to transfer data and instructions uni-directionally to CPU 1332, while RAM is used typically to transfer data and instructions in a bi-directional manner. Both storage devices 1334, 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which generally slower than primary storage devices 1334, 1336. Mass memory storage device 1338 may take the form of a magnetic or paper tape reader or some other well-known device. It will be appreciated that the information retained within the mass memory device 1338, may, in appropriate cases, be incorporated in standard fashion as part of RAM 1336 as virtual memory. A specific primary storage device 1334 such as a CD-ROM may also pass data uni-directionally to the CPU 1332.

CPU 1332 are also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above monitor programs and integrated monitoring system may be recognized as sets of computer codes and that such computer codes are typically stored in computer readable mediums such as RAM, ROM, hard discs, floppy discs, or carrier waves and the like.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A computer-implemented method for testing and monitoring applications, the method comprising:
   (a) sending a first test signal to elicit a response from a first element of an authentication and authorization system;
   (b) monitoring the authentication and authorization system for the response to the first test signal;
   (c) checking the response to the first test signal;
   (d) sending a second test signal to elicit a response from a second element of the authentication and authorization system, wherein the second element is independent and distinct from the first element;
   (e) monitoring the authentication and authorization system for the response to the second test signal;
   (f) checking the response to the second test signal; and
   (g) reporting the results of checking the responses to the first and second test signal;
   wherein one of the first and second elements is an access server and wherein the other of the first and second elements is a register server.

2. The computer implemented method of claim 1, wherein the application is monitored in b) and e) by a monitoring program;
   wherein monitoring in b) and e) further comprises monitoring the time at which the test signal is sent and monitoring a response time from the sending of the test signal to the receiving of the response from that test signal;
   wherein the results comprise the response time from the sending of one of the test signals to the receiving of the response to that test signal by the monitoring program and the time at which that test signal was sent.

3. The computer-implemented method of claim 1, wherein reporting the results comprises sending notification based on the presence of predefined results.

4. The computer-implemented method of claim 3, wherein sending notification comprises sending a page.

5. The computer-implemented method of claim 3, wherein sending notification comprises sending an e-mail.

6. The computer-implemented method of claim 1, wherein reporting the results comprises the results in a datastore.

7. The computer-implemented method of claim 6, wherein recording the results in a datastore comprises storing the results in a text file.

8. The computer-implemented method of claim 6, wherein recording the results in a datastore comprises storing the results in a relational database.

9. The computer implemented method of claim 1, wherein reporting the results comprises:

sending notification based on the presence of predefined results; and recording the results in a datastore.

10. A computer-implemented method for testing and monitoring applications, the method comprising:
(a) sending a first test signal to elicit a response via a first channel of a messaging service;
(b) monitoring the messaging service for the response to the first test signal;
(c) checking the response to the first test signal;
(d) sending a second test signal to elicit a response via a second channel of the messaging service, wherein the second channel is independent and distinct from the first channel;
(e) monitoring the messaging service for the response to the second test signal;
(f) checking the response to the second test signal; and
(g) reporting the results of checking the responses to the first and second test signals;

wherein one of the first and second channels is a send channel, and wherein the other of the first and second channels is a receive channel.

11. A computer-implemented method for testing and monitoring applications, the method comprising:
(a) sending a first test signal to elicit a response via a first channel of a publish/subscribe service;
(b) monitoring the publish/subscribe service for the response to the first test signal;
(c) checking the response to the first test signal;
(d) sending a second test signal to elicit a response via a second channel of the publish/subscribe service, wherein the second channel is independent and distinct from the first channel;
(e) monitoring the publish/subscribe service for the response to the second test signal;
(f) checking the response to the second test signal; and
(g) reporting the results of checking the responses to the first and second test signals;

wherein one of the first and second channels is a publish channel, and wherein the other of the first and second channels is a subscribe channel.

12. A computer-implemented method for testing and monitoring applications, the method comprising:
(a) sending a first test signal to elicit a response from a first object of a CORBA-compliant transaction service;
(b) monitoring the CORBA-compliant transaction service for the response to the first test signal;
(c) checking the response to the first test signal;
(d) sending a second test signal to elicit a response from a second object of the COBRA-compliant transaction service, wherein the second object is independent and distinct from the first object;
(e) monitoring the COBRA-compliant transaction service for the response of the second test signal;
(f) checking the response to the second test signal; and
(g) reporting the results of checking the responses to the first and second test signal;

wherein the first object is an OTS daemon and wherein the second object is a completion daemon.

13. The computer-implemented method of claim 12, further comprising:
(a) sending a third test signal to elicit a response from a recovery daemon;
(b) monitoring the COBRA-compliant transaction service for the response to the first test signal;
(c) checking the response to the third test signal;
(d) sending a fourth test signal to elicit a response from a transaction daemon;
(e) monitoring the COBRA-compliant transaction service for the response to the fourth test signal;
(f) checking the response to the fourth test signal;

wherein reporting the results of checking the responses to the first and second test signals comprises reporting the results of checking the responses to the first, second, third, and fourth test signals; and wherein the sending of the first through fourth test signals may occur in any order.

14. A computer-implemented method for testing and monitoring applications, the method comprising:
(a) sending a first test signal to elicit a response from a first object of a naming service;
(b) monitoring the naming service for the response to the first test signal;
(c) checking the response to the first test signal;
(d) sending a second test signal to elicit a response from a second object of the naming service, wherein the second object is independent and distinct from the first object;
(e) monitoring the naming service for the response to the second test signal;
(f) checking the response to the second test signal; and
(g) reporting the results of checking the responses to the first and second test signals;

wherein the one of the first and second objects is a register object; and wherein the other of the first and second objects is a resolve object.

15. A computer-implemented method for testing and monitoring applications, the method comprising:
(a) sending a first test signal via a send channel of a messaging service to elicit a response;
(b) monitoring the messaging service for the response to the first test signal;
(c) checking the response to the first test signal;
(d) sending a second test signal via a receive channel of the messaging service to elicit a response;
(e) monitoring the messaging service for the response to the second test signal;
(f) checking the response to the second test signal; and
(g) reporting the results of checking the responses to the first and second test signals;

16. The computer-implemented method of claim 15, wherein the order of sending the test signals is selected from one of the group consisting of:

the first test signal is sent prior to the sending of the second test signal;

the second test signal is sent prior to the first test signal; and the first and second test signal are sent approximately simultaneously.

17. The computer implemented method of claim 15, wherein the application is monitored in b) and e) by a monitoring program;

wherein monitoring in b) and e) further comprises monitoring the time at which the test signal is sent and monitoring a response time from the sending of the test signal to the receiving of the response from that test signal;

wherein the results comprise the response time from the sending of one of the test signals to the receiving of the response to that test signal by the monitoring program and the time at which that test signal was sent.

18. A computer-implemented method for testing and monitoring applications, the method comprising:

(a) sending a first test signal via a publish channel of a publish/subscribe service to elicit a response;

(b) monitoring the publish/subscribe service for the response to the first test signal;

(c) checking the response to the first test signal;

(d) sending a second test signal via a subscribe channel of the publish/subscribe service to elicit a response;

(e) monitoring the publish/subscribe service for the response to the second test signal;

(f) checking the response to the second test signal; and (g) reporting the results of checking the responses to the first and second test signals.

19. The computer-implemented method of claim 18, wherein the order of sending the test signals is selected from one of the group consisting of:

the first test signal is sent prior to the sending of the second test signal;

the second test signal is sent prior to the first test signal; and the first and second test signal are sent approximately simultaneously.

20. The computer implemented method of claim 18, wherein the application is monitored in b) and e) by a monitoring program;

wherein monitoring in b) and e) further comprises monitoring the time at which the test signal is sent and monitoring a response time from the sending of the test signal to the receiving of the response from that test signal;

wherein the results comprise the response time from the sending of one of the test signals to the receiving of the response to that test signal by the monitoring program and the time at which that test signal was sent.

21. A computer-implemented method for testing and monitoring applications, the method comprising:

(a) sending a first test signal to elicit a response from a register object of a naming service;

(b) monitoring the messaging service for the response to the first test signal;

(c) checking the response to the first test signal;

(d) sending a second test signal to elicit a response from a resolve object of the naming service;

(e) monitoring the naming service for the response to the second test signal;

(f) checking the response to the second test signal; and (g) reporting the results of checking the responses to the first and second test signals;

22. The computer-implemented method of claim 21, wherein the order of sending the test signals is selected from one of the group consisting of:

the first test signal is sent prior to the sending of the second test signal;

the second test signal is sent prior to the first test signal; and the first and second test signal are sent approximately simultaneously.

23. The computer-implemented method of claim 21, wherein the order of sending the test signals is selected from one of the group consisting of:

the first test signal is sent prior to the second test signal;

the second test signal is sent prior to the first test signal; and the first and second test signal are sent approximately simultaneously.

24. The computer implemented method of claim 21, wherein the application is monitored in b) and e) by a monitoring program;

wherein monitoring in b) and e) further comprises monitoring the time at which the test signal is sent and monitoring a response time from the sending of the test signal to the receiving of the response from that test signal;

wherein the results comprise the response time from the sending of one of the test signals to the receiving of the response to that test signal by the monitoring program and the time at which that test signal was sent.

25. A computer-implemented method for testing and monitoring applications, the method comprising:

(a) sending a first test signal to elicit a response from an access server of an authentication and authorization system;

(b) monitoring the authentication and authorization system for the response to the first test signal;

(c) checking the response to the first test signal;

(d) sending a second test signal to elicit a response from a register server of the authentication and authorization system;

(e) monitoring the authentication and authorization system for the response to the second test signal;

(f) checking the response to the second test signal; and (g) reporting the results of checking the responses to the first and second test signals;

26. The computer implemented method of claim 25, wherein the application is monitored in b) and e) by a monitoring program;

wherein monitoring in b) and e) further comprises monitoring the time at which the test signal is sent and monitoring a response time from the sending of the test signal to the receiving of the response from that test signal;

wherein the results comprise the response time from the sending of one of the test signals to the receiving of the response to that test signal by the monitoring program and the time at which that test signal was sent.

27. A computer-implemented method for testing and monitoring applications, the method comprising:

(a) sending a first test signal to elicit a response from a first object of a transaction service, wherein the first object is selected from a first member of the group consisting essentially of: an OTS daemon, a completion daemon, a recovery daemon, and a transaction daemon;

(b) monitoring the transaction service for the response to the first test signal;

(c) checking the response to the first test signal;

(d) sending a second test signal to elicit a response from a second object of the transaction service, wherein the second object is selected from a second member of the group consisting essentially of: an OTS daemon, a completion daemon, a recovery daemon, and a transaction daemon;

(e) monitoring the transaction service for the response to the second test signal;

(f) checking the response to the second test signal; and (g) reporting the results of checking the responses to the first and second test signals.

28. The computer-implemented method of claim 27, further comprising:

(h) sending a third test signal to elicit a response from a third object of the transaction service, wherein the third object is selected from a third member of the group consisting essentially of: OTS daemon, a completion daemon, a recovery daemon, and a transaction daemon;

(i) monitoring the transaction service for the response to the third test signal;

(j) checking the response to the third test signal; and wherein reporting the results of checking the responses to the first and second test signals comprises reporting the results of checking the responses to the first, second and third test signals; and wherein the sending of the first through third test signals may occur in any order.

29. The computer-implemented method of claim 28, further comprising:

(k) sending a fourth test signal to elicit a response from a fourth object of the transaction service, wherein the fourth object is the remaining member of the group consisting essentially of: OTS daemon, a completion daemon, a recovery daemon, and a transaction daemon;

(l) monitoring the transaction service for the response to the fourth test signal;

(m) checking the response to the fourth test signal; and wherein reporting the results of checking the responses to the first, second, and third test signals comprises reporting the results of checking the responses to the first, second, third, and fourth test signals; and wherein the sending of the first through fourth test signals may occur in any order.

30. The computer-implemented method of claim 29, wherein the transaction service is a COBRA-compliant transaction service.

31. The computer implemented method of claim 27, wherein the application is monitored in b) and e) by a monitoring program;

wherein monitoring in b) and e) further comprises monitoring the time at which the test signal is sent and monitoring a response time from the sending of the test signal to the receiving of the response from that test signal;

wherein the results comprise the response time from the sending of one of the test signals to the receiving of the response to that test signal by the monitoring program and the time at which that test signal was sent.

* * * * *